United States Patent
Egi et al.

(10) Patent No.: US 9,201,837 B2
(45) Date of Patent: Dec. 1, 2015

(54) DISAGGREGATED SERVER ARCHITECTURE FOR DATA CENTERS

(71) Applicant: Futurewei Technologies, Inc., Plano, TX (US)

(72) Inventors: Norbert Egi, Santa Clara, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 245 days.

(21) Appl. No.: 13/802,046

(22) Filed: Mar. 13, 2013

(65) Prior Publication Data

US 2014/0280687 A1    Sep. 18, 2014

(51) Int. Cl.
*G06F 15/167* (2006.01)
*G06F 15/173* (2006.01)

(52) U.S. Cl.
CPC ................................ *G06F 15/17331* (2013.01)

(58) Field of Classification Search
CPC ................................ G06F 12/10; G06F 9/455
USPC .................................................. 709/214, 204
See application file for complete search history.

(56) References Cited

U.S. PATENT DOCUMENTS

| | | | |
|---|---|---|---|
| 7,558,261 B2 | 7/2009 | Arregoces et al. | |
| 7,643,468 B1 | 1/2010 | Arregoces et al. | |
| 2008/0244150 A1* | 10/2008 | Sharma | 710/316 |
| 2010/0061375 A1 | 3/2010 | Yang et al. | |
| 2010/0115078 A1 | 5/2010 | Ishikawa et al. | |
| 2012/0185855 A1 | 7/2012 | Cervantes et al. | |
| 2012/0210042 A1 | 8/2012 | Lim et al. | |
| 2012/0281708 A1* | 11/2012 | Chauhan et al. | 370/401 |

FOREIGN PATENT DOCUMENTS

| | | |
|---|---|---|
| CN | 101170416 A | 4/2008 |
| WO | 2012061625 A2 | 5/2012 |

OTHER PUBLICATIONS

Foreign Communication From a Counterpart Application, PCT Application No. PCT/CN2014/073276, International Search Report dated Jun. 30, 2014, 8 pages.
Foreign Communication From a Counterpart Application, PCT Application No. PCT/CN2014/073276, Written Opinion dated Jul. 8, 2014, 5 pages.

* cited by examiner

*Primary Examiner* — David Lazaro
*Assistant Examiner* — Zia Khurshid
(74) *Attorney, Agent, or Firm* — Conley Rose, P.C.; Grant Rodolph; Brandt D. Howell

(57) ABSTRACT

A system comprising a unified interconnect network, a plurality of process memory modules, and a plurality of processor modules configured to share access to the memory modules via the unified interconnect network. Data may be communicated between a plurality of processor modules and a plurality of shared resource pools via a unified interconnect network, wherein the communications comprise a protocol that is common to all resource pools, and wherein each resource pool comprises a plurality of resource modules each configured to perform a common function. Further, a network interface controller (NIC) module may be configured to receive data from a plurality of processor modules via a unified interconnect network, and provide core network connectivity to the processor modules.

16 Claims, 3 Drawing Sheets

DISAGGREGATED SERVER ARCHITECTURE FOR DATA CENTERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data centers may comprise large clusters of servers. Data center servers may accept requests from users and respond to such requests. For example, servers may host data and transmit such data to a user upon request. A server may also be configured to host processes. As such, a user may transmit a request to a server to perform a process, the server may perform the process, and then the server may respond to the user with the results of the process. A server may comprise a plurality of components to process user requests and communicate with the user. Such components may be interconnected using various networking devices and techniques. As server components may be required to be compatible, upgrading some server components may obsolete other server components, which may require further upgrades. Server components may also be dedicated for use by a single user and may not be shared between users.

SUMMARY

In one embodiment, the disclosure includes a system comprising a unified interconnect network, a plurality of process memory modules, and a plurality of processor modules configured to share access to the memory modules via the unified interconnect network.

In another embodiment, the disclosure includes a method comprising communicating data between a plurality of processor modules and a plurality of shared resource pools via a unified interconnect network, wherein the communications comprise a protocol that is common to all resource pools, and wherein each resource pool comprises a plurality of resource modules each configured to perform a common function.

In another embodiment, the disclosure includes an apparatus comprising a network interface controller (NIC) module configured to receive data from a plurality of processor modules via a unified interconnect network, and provide core network connectivity to the processor modules.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a disaggregated data center architecture comprising resource pools connected via a unified interconnect network. Server components may be disaggregated (e.g. physically separated and divided into groups) and positioned in the resource pools. The resource pools may comprise resource modules such as processor modules, process memory modules, data storage modules, process accelerator modules, and/or NIC modules. The resource pool modules may communicate via the unified interconnect network using a common protocol. In the disaggregated data center network architecture, processors may elastically share resource pool resources and resource modules may communicate directly with other resource modules. As resources may employ a common protocol, resource modules may be upgraded in a modular fashion without requiring attendant upgrades in other resource modules. Furthermore, data centers employing the disaggregated data center network architecture may purchase and deploy resource modules with a high degree of granularity instead of being forced to purchase an entire server with all attendant resources.

Figure 1:
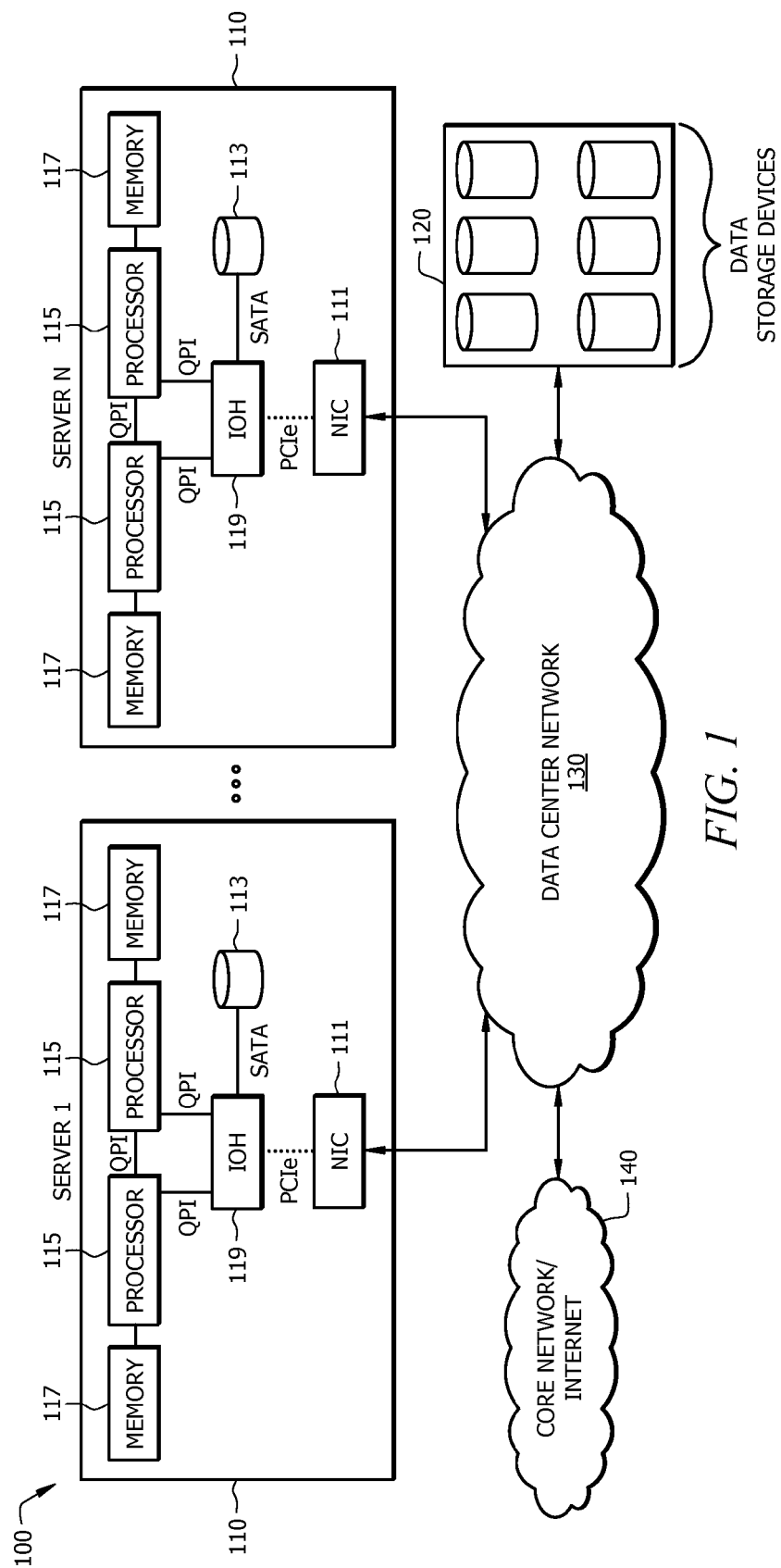
FIG. 1 is a schematic diagram of an embodiment of a server based data center network architecture for a data center.

FIG. 1 is a schematic diagram of an embodiment of a server based data center network architecture 100 for a data center. Network 100 may comprise a plurality of servers 110 connected to the core network 140 and data storage devices 120 via a data center network 130. Servers 110 may receive requests from remote hosts via the core network 140 and the data center network 130. The servers 110 may process the requests, store and/or retrieve data from the data storage devices 120, and respond to requests via the data center network 130 and the core network 140.

Servers 110 may be configured to host processes, data, and/or respond to user and/or administrator requests. Servers 110 may comprise processor(s) 115, which may execute commands to perform the functions which may be required of the server 110. Processors 115 may use multithreading and/or other technologies to process a plurality of requests substantially simultaneously. Processors 115 may comprise a single processor, a processor cluster, and/or groups of processor clusters. Processors 115 may receive input, process requests, and generate output. Servers 110 may further comprise memory 117, which may be dedicated to processors 115 and may be used for storing instructions and/or data associated with a process being executed by a processor 115 at a specified time. Servers 110 may further comprise local storage devices 113 which may be shared among processors 115 on a single server 110 and be used to store instructions and/or data which may be associated with a process being executed by a processor 115 at a specified time. Memory 117 may comprise a faster access time than local storage devices 113, but local storage device 113 may be configured to store more data than memory 117. Each server 110 may further comprise a NIC 111 for connecting to the data center network 130.

The processors 115 may be directly connected to memory 117 and may be connected to the NIC 111 and the local storage device 113 via an input and/or output hub (IOH) 119. Server 110 components may communicate via a plurality of protocols and the IOH 119 may receive messages in a first protocol, translate the messages into a second protocol, and send the messages to other server 110 components. For example, the processors 115 may communicate with the IOH 119 via an Intel™ QuickPath Interconnect (QPI) protocol, local storage devices 113 may communicate with the IOH 119 via a serial advanced technology attachment (SATA) protocol, and NICs 111 may communicate with the IOH 119 via a Peripheral Component Interconnect Express (PCI-e) protocol.

Servers 110 may transmit and/or receive data via the data center network 130, the core network 140, and the Internet. The data center network 130 may comprise network connections in the data center that interconnect the servers 110 and other data center components such as data storage devices 120. The core network 140 may connect to the data center network 130 and may comprise components that perform aggregation, authentication, switching, charging, service invocation and other services to the data center and/or remote hosts.

Network 100 may also comprise data storage devices 120 which may be shared by servers 110. Data storage devices 120 may comprise slower access time than memory 117 and local storage device 113 and may be physically remote from the servers 110. Data storage devices 120 may also comprise substantial storage space and may store data which may not be used at a specified time (e.g. long term storage.) Servers 110 may store and/or retrieve data from data storage devices 120 in response to requests from remote hosts, process the data, and send responsive data to the remote hosts via the data center network 130, the core network 140, and the Internet.

Network 100 may only be configured to share the resources associated with data storage devices 120. For example, if a data center employing network 100 requires additional memory 117 for a processor 115, the memory 117 and/or processor 115 may be replaced/upgraded and/or an entire new server 110 may be purchased. As another example, if a network requires additional processing power, an entire new server 110 may be purchased with a large number of processors 115. As another example, if a processor 115 is upgraded, memory 117, IOH 119, local storage device 113, and/or NIC 111 may be upgraded to work with the upgraded processor 115. As another example, a server 110 with an underutilized resources (e.g. NIC 111, local storage device 113, memory 117, and/or processors 115) may not share such resources with another server 110 and/or may only do so based on complicated virtualization techniques. As such, resources associated with servers 110 may not be modified and/or shared granularly.

Figure 2:
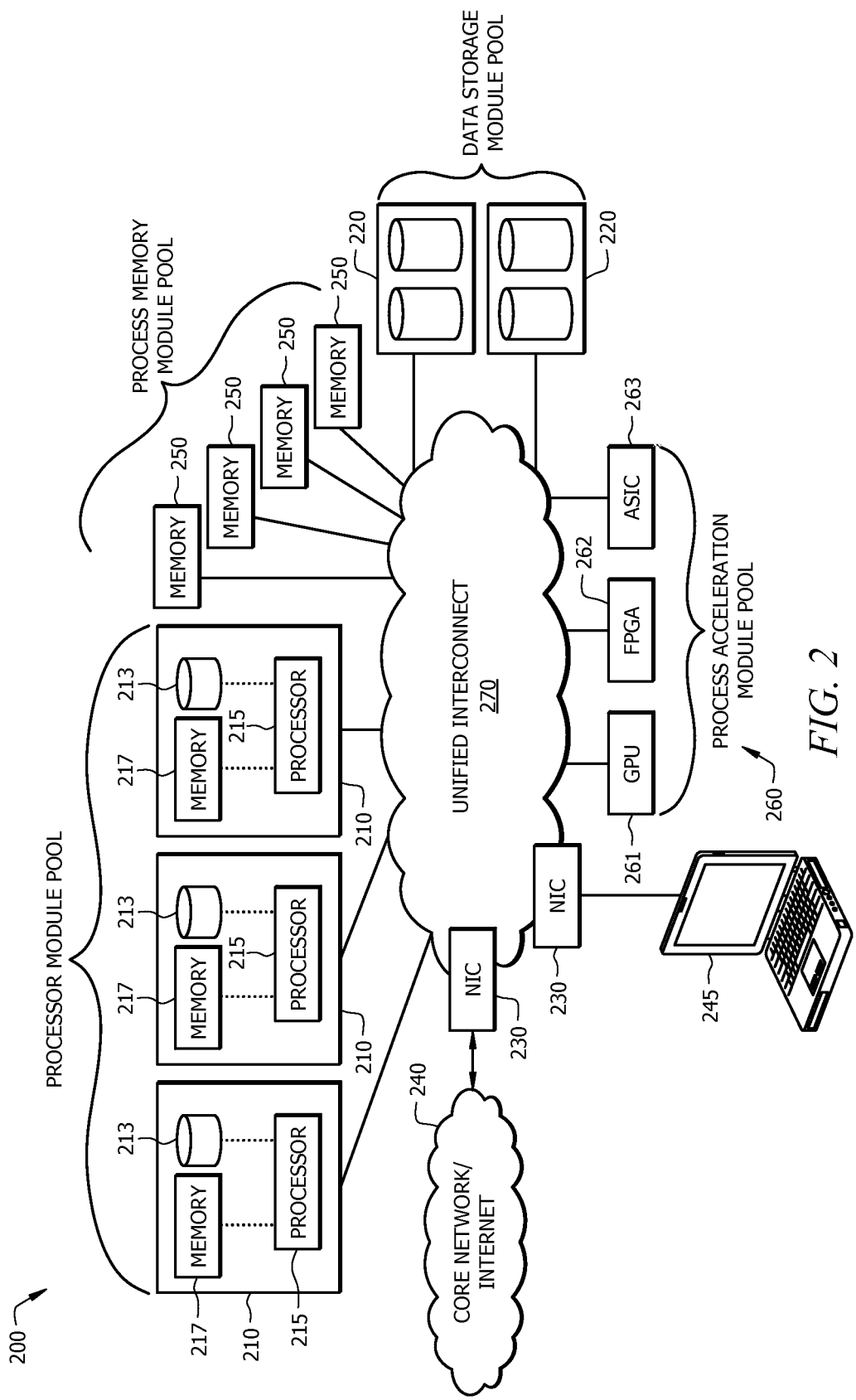
FIG. 2 is a schematic diagram of an embodiment of a disaggregated data center network architecture.

FIG. 2 is a schematic diagram of an embodiment of a disaggregated data center network architecture 200. Network 200 may comprise a pool of processor modules 210, a pool of process memory modules 250, a pool of data storage modules 220, a pool of process acceleration modules 260, and a pool of NIC modules 230, which may be connected via a unified interconnect network 270. The processor modules 210, process memory modules 250, a data storage modules 220, process acceleration modules 260, NIC modules 230, and unified interconnect network 270 may be positioned in a common datacenter and may not be position in a common enclosure (e.g. each module may comprise a separate server, server blade, network element, etc.) Each module pool may comprise a plurality of resource modules each configured to perform a common function. The processor modules 210 may each share access to the other modules resources via the unified interconnect network 270. The unified interconnect network 270 may employ a protocol common to all modules, which may allow individual modules to be upgraded, added, and/or removed without creating module incompatibility. The processor modules' 210 ability to share resources may also allow for resource load balancing and may reduce process bottlenecks.

Each module (e.g. processor modules 210, process memory modules 250, data storage modules 220, process acceleration modules 260, and/or NIC modules 230) may comprise and/or consist essentially of the components necessary to perform a task and maybe position in a separate network element (NE) from all other modules. For example, processor modules 210 may comprise and/or consist essentially of a processor 215, which may be a single processor and/or a processor cluster, and may be substantially similar to processor 115. Processor module 210 may also optionally comprise and/or consist essentially of local process memory 217 and local storage 213, which may be substantially similar to memory 117 and local storage device 113, respectively as well as transmission components to connect to the unified interconnect network 270 and power related components. Processor modules 210 may be positioned in a blade server, which may be less expensive and physically smaller than rack servers, and may be unable to provide complete functionality without access to the unified interconnect network 270.

Network 200 may comprise a pool of process memory modules 250, which may comprise and/or consist essentially of memory (e.g. Random Access Memory (RAM), processor cache. etc.) that may operate in a manner similar to memory 117 and may store processor data for related to active processes. Process memory modules 250 may comprise storage resources that may be allocated to a particular processor 215, a particular processor module 210, and/or shared by a plurality or processor modules 210. The allocation of memory modules 250 may be dynamically changed based on the needs of the network 200 at a specified time. A process memory module 250 may be positioned on a blade server. For example, a process memory module 250 may consist essentially of memory, transmission components to support connection with unified interconnect network 270, and power components.

Network 200 may comprise a pool of data storage modules 220, which may comprise and/or consist essentially of data storage devices configured for long term storage (e.g. disk drives, solid state drives, redundant array of independent disks (RAID), etc.) that may operate in a manner similar to data storage devices 120. Data storage modules 220 may comprise storage resources that may be allocated to a particular processor 215, a particular processor module 210, and/or shared by a plurality of processor modules 210. The allocation of a data storage modules 220 may be dynamically changed based on the needs of the network 200 at a specified time. A data storage module 220 may be positioned on a blade server. For example, a data storage module 220 may consist essentially of data storage device(s), transmission components to support connection with unified interconnect network 270, and power components.

Network 200 may comprise a pool of process acceleration modules 260, which may comprise and/or consist essentially of process accelerators such as application specific integrated circuits (ASICs) 263, field programmable gate arrays (FPGAs) 262, graphics processing units (GPUs) 261, digital signal processors (DSPs), etc. Process accelerators may be optimized for a specific task and may perform such specific tasks more quickly and/or efficiently than a general processing unit (e.g. processors 215). A processor 215 may wish to offload all or part of a particular process and may transmit a resource request to process acceleration modules 260, and process acceleration modules 260 may employ process accelerators to complete the process and transmit resulting data back to the requesting processor 215. Process acceleration modules 260 may comprise processing resources that may be allocated to a particular processor 215, a particular processor module 210, and/or shared by a plurality or processor modules 210. The allocation of a process acceleration module 260 may be dynamically changed based on the needs of the network 200 at a specified time. A process acceleration module 260 may be positioned on a blade server. For example, a process acceleration module 260 may consist essentially of a process accelerator (e.g. ASIC 263, FPGA 262 and/or GPU 261), transmission components to support connection with unified interconnect network 270, and power components.

Network 200 may comprise a pool of NIC modules 230, which may comprise and/or consist essentially of NICs configured to communicate with a data center core network 240, the Internet, and/or a local client device 245 on behalf of the other modules and may operate in a manner similar to NIC 111. As an example, NIC modules 230 may comprise connectivity resources that may be allocated to a particular processor 215, a particular processor module 210, and/or shared by a plurality or processor modules 210. The allocation of a NIC module 230 and/or NIC module 230 resources may be dynamically changed based on the needs of the network 200 at a specified time. As another example, the NIC modules 230 may be configured to communicate with the core network on behalf of the processor modules 210, the process acceleration modules 260, the process memory modules 250, the storage modules 220, or combinations thereof. As such, a processor module 210 may direct other modules to communicate output directly to the NIC 230 without returning to a processor module 210. A NIC module 230 may be positioned on a blade server. For example, a NIC module 230 may consist essentially of NIC(s) for communication with the core network 240, transmission components to support connection with unified interconnect network 270, and power components.

The pools of modules (e.g. processor modules 210, process memory modules 250, data storage modules 220, process acceleration modules 260, and/or NIC modules 230) may be interconnected by a unified interconnect network 270. The unified interconnect network 270 may transport communications between the modules and/or pools in a non-blocking manner. The unified interconnect network 270 may comprise any hardware and/or protocols that may be compatible with all modules. For example, the unified interconnect network 270 may comprise a Peripheral Component Interconnect Express (PCI-e) network and/or an Infiniband network. The unified interconnect network 270 may not be confined to a particular module (e.g. positioned inside a server blade) and may be routed throughout a data center. Modules comprising components that do not natively support connections via the unified interconnect network 270 may comprise processors and/or other connection components to support interconnectivity. For example, process memory modules 250 may comprise process memory that does not natively support PCI-e protocols. As such, when the unified interconnect network 270 comprises a PCI-e network, the process memory modules 250 may comprise a processor configured to translate PCI-e communications to a protocol that may be native to the process memory.

The resource pools may comprise modules that may be shared by other modules, which may allow for efficient load balancing of the associated resources. For example, resource sharing may be accomplished by hardware level virtualization, which may allow modules to be accessed in parallel by multiple modules. The resource sharing of network 200 may prevent underutilization of certain resources and overutilization of other resources, which may in turn result in increased latency and a need to upgrade equipment. As such, network 200 may perform the same services as network 100 with fewer resources and a lower equipment cost. Equipment additions and/or upgrades may also be made at the pool level instead of at the server level, which may allow granular equipment upgrades. For example, overutilization of process memory may be remedied by the addition of a process memory module 250 to the process memory module 250 pool, without the need for an addition to the processor module 210 pool. Granular upgrades may also reduce the cost of operating a data center. As another example, since the modules may all be compatible with unified interconnect network 270, an upgrade to a particular module may have little effect on other modules. As such, upgrading a module (e.g. processor 215) may not necessitate an upgrade of other modules (e.g. process memory module 250.) Compatibility necessitated upgrades may be common in network 100 as different components may become obsolete at different rates (e.g. an upgrade to processor 115 may necessitate an upgrade to memory 117 and/or IOH 119.) The reduction and/or elimination of compatibility based upgrades may further reduce the cost to operate a data center. Network 200 may be scaled from the size of a multi-rack enclosure to the size of an entire data center.

Figure 3:
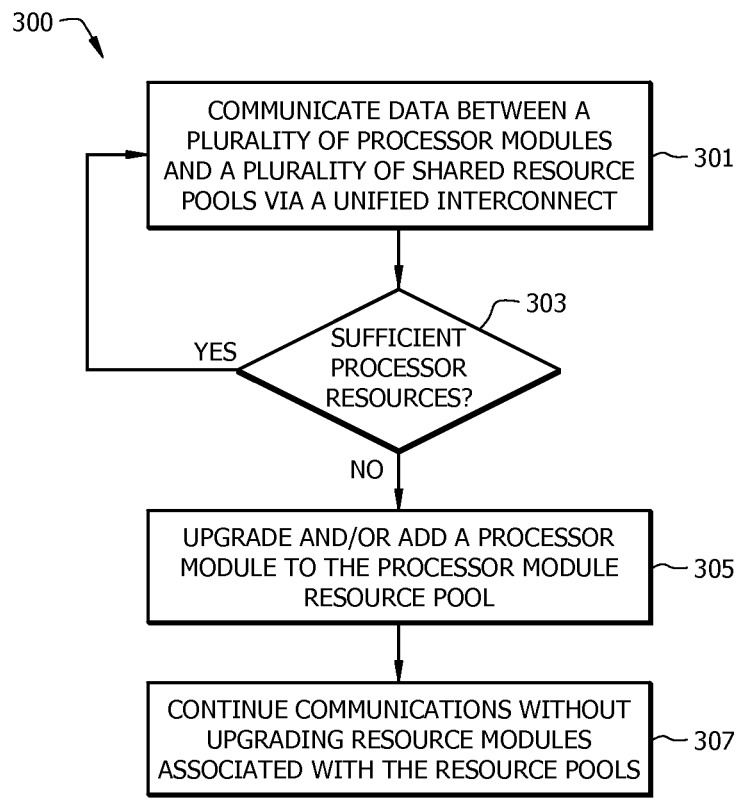
FIG. 3 is a flow chart of an embodiment of a method of upgrading data center resources.

FIG. 3 is a flow chart of an embodiment of a method 300 of upgrading data center resources, for example in network 200. At step 301, the method 300 may communicate data between a plurality of shared resource pools (e.g. processor module 210 pool, process memory module 250 pool, data storage module 220 pool, process acceleration module pool 260, and/or NIC 230 pool) via a unified interconnect network (e.g unified interconnect network 270.) The shared resource pools and the unified interconnect network may be positioned in the data center. At step 303, the method may determine if there are sufficient processor resources in the data center network to support desired data center functionality. The method may proceed to step 305 if the resources are insufficient and return to step 301 if the resources are sufficient. At step 305, the method 300 may upgrade and/or add a processor module to the processor module pool. At step 307, the method 300 may continue communications without upgrading resource modules associated with the other resource pools.

Figure 4:
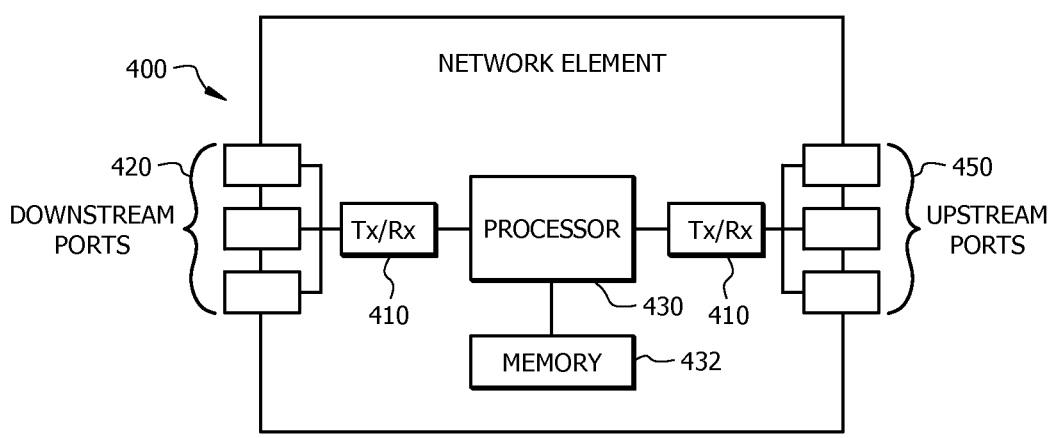
FIG. 4 is a schematic diagram of an embodiment of a Network Element (NE).

FIG. 4 is a schematic diagram of an embodiment of a network element (NE) 400, which may comprise a server 110, data storage device 120, processor module 210, process memory module 250, process acceleration module 260, and/or NIC module 230. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features/methods described in the disclosure, for example method 300 of upgrading data center resources, may be implemented using a network apparatus or component such as an NE 400. For instance, the features/methods in the disclosure may be implemented using hardware, firmware, and/or software installed to run on hardware. The NE 400 may be any device that transports frames through a network, e.g., a switch, router, bridge, server, a client, etc. As shown in FIG. 4, the NE 400 may comprise transceivers (Tx/Rx) 410, which may be transmitters, receivers, or combinations thereof. A Tx/Rx 410 may be coupled to plurality of downstream ports 420 for transmitting and/or receiving frames from other nodes, a Tx/Rx 410 coupled to plurality of upstream ports 450 for transmitting and/or receiving frames from other nodes. A processor 430 may be coupled to the Tx/Rxs 410 to process the frames and/or determine which nodes to send frames to. The processor 430 may comprise one or more multi-core processors and/or memory devices 432, which may function as data stores, buffers, etc. Processor 430 may be implemented as a general processor or may be part of one or more ASICs and/or DSPs. The downstream ports 420 and/or upstream ports 450 may contain electrical and/or optical transmitting and/or receiving components. NE 400 may or may not be a routing component that makes routing decisions.

It is understood that by programming and/or loading executable instructions onto the NE 400, at least one of the processor 430, downstream ports 420, Tx/Rxs 410, memory 432, and/or upstream ports 450 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, Ru, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:
1. A system comprising:
a unified interconnect network;
a memory pool comprising a plurality of process memory modules configured to cache process data, wherein each process memory module in the memory pool is positioned in one of a plurality of memory blade servers; and
a processor pool comprising a plurality of processor modules configured to share access to the process memory modules in the memory pool for caching the process data via the unified interconnect network, wherein each processor module in the processor pool is positioned in one of a plurality of processor blade servers that are each separate from the memory blade servers.

2. The system of claim 1, wherein the unified interconnect network comprises a Peripheral Component Interconnect Express (PCI-e) network.

3. The system of claim 1, wherein the unified interconnect network comprises an Infiniband network.

4. The system of claim 1, further comprising a data storage pool comprising a plurality of data storage modules configured for data storage, wherein the plurality of processor modules in the processor pool are further configured to share access to the storage modules in the data storage pool via the unified interconnect network.

5. The system of claim 4, further comprising a network interface pool comprising a plurality of network interface controller modules configured for core network connectivity, wherein the plurality of processor modules in the processor pool are further configured to share access to the network interface controller modules in the network interface pool via the unified interconnect network.

6. The system of claim 5, further comprising a process acceleration pool comprising a plurality of process acceleration modules, wherein the plurality of processor modules in the processor pool are further configured to share access to the process acceleration modules in the process acceleration pool via the unified interconnect network.

7. The system of claim 6, wherein the process acceleration modules comprise a graphics processing unit (GPU), a field programmable gate array (FPGA), an application specific integrated circuit (ASIC), or combinations thereof.

8. The system of claim 1, wherein the processor blade servers do not comprise local process memory or local data storage.

9. The system of claim 1, wherein the processor modules, the process memory modules, and the unified interconnect network are positioned in a data center.

10. A method comprising:
communicating data in a system between a processor pool comprising a plurality of processor modules and a plurality of shared resource pools via a unified interconnect network, wherein each shared resource pool comprises at least one resource module, wherein all resource modules in each shared resource pool are configured to perform a common function, wherein each processor module is positioned in a separate processor blade server, and wherein each resource module is positioned in a separate resource specific blade server; and
upgrading a processor module in the processor pool while the system is communicating data by replacing one of the processor blade servers.

11. The method of claim 10, further comprising upgrading a resource module while the system is operational by replacing one of the resource specific blade servers.

12. The method of claim 10, wherein at least one of the shared resource pools comprises a process memory module pool, and wherein the method further comprises sharing storage resources of the process memory module pool among the processor modules.

13. The method of claim 10, wherein at least one of the shared resource pools comprises a process acceleration module pool, and wherein the method further comprises sharing process resources of the process acceleration module pool among the processor modules.

14. The method of claim 10, wherein at least one of the shared resource pools comprises a data storage module pool, and wherein the method further comprises sharing storage resources of the data storage module pool among the processor modules.

15. The method of claim 10, wherein at least one of the shared resource pools comprises a network interface controller module pool, and wherein the method further comprises sharing connectivity resources of the network interface controller module pool among the processor modules.

16. A system consisting essentially of:
a processor module pool consisting essentially of processor blade servers configured to process data;
a process memory module pool consisting essentially of process memory blade servers configured to cache data for the processor module pool during processing;
a data storage module pool consisting essentially of data storage blade servers configured to provide data storage for the processor module pool;
a process acceleration module pool consisting essentially of process acceleration blade servers configured to perform accelerated processing for the processor module pool;
a network interface controller module pool consisting essentially of network interface controller blade servers configured to communicate with a core network for the processor module pool; and
a unified interconnect network configured to couple the processor module pool, the process memory module pool, the data storage module pool, the process acceleration module pool, and the network interface controller module pool to support resource sharing between the pools,
wherein no blade server contains modules associated with more than one pool.

* * * * *